Figure 2:
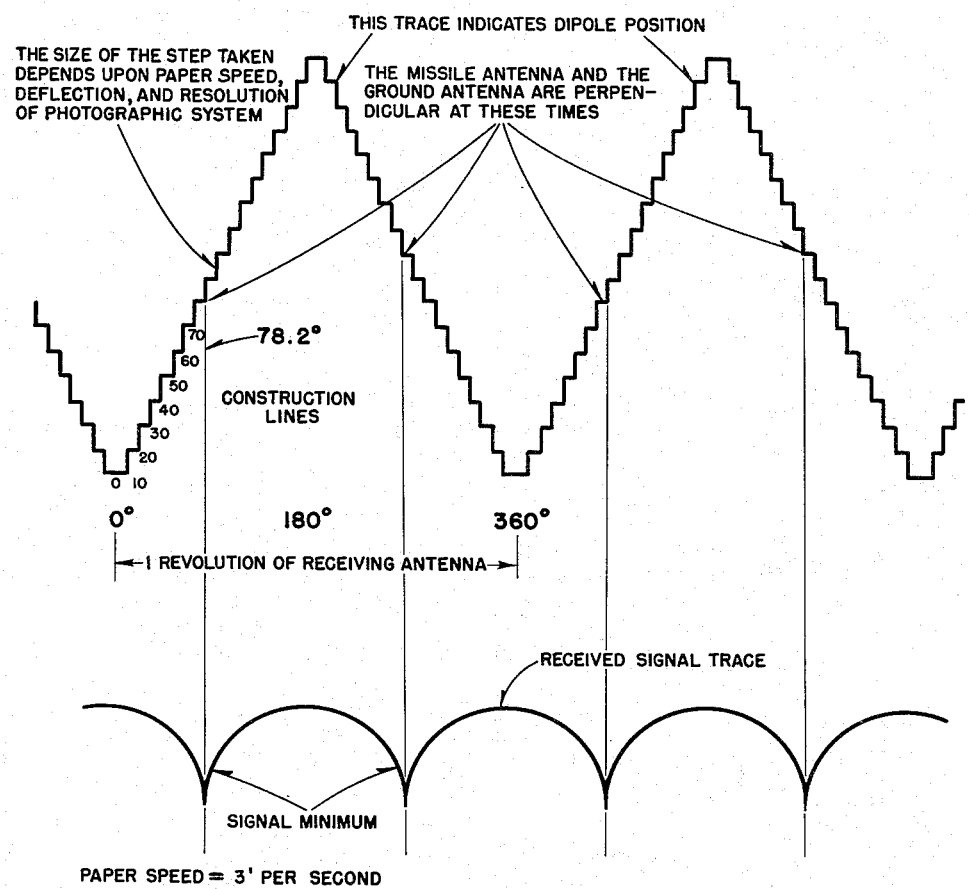

Aug. 8, 1961 — R. O. ROBINSON, JR — 2,995,749
ROLL INDICATION SYSTEM
Filed May 21, 1952 — 2 Sheets-Sheet 1
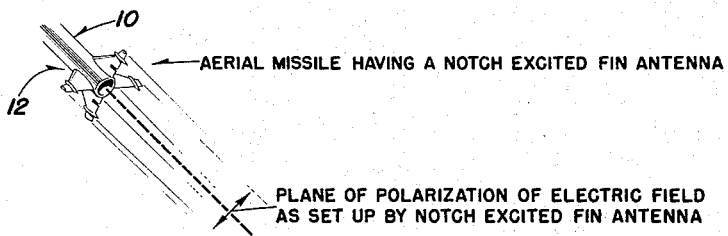
FIG. 1.
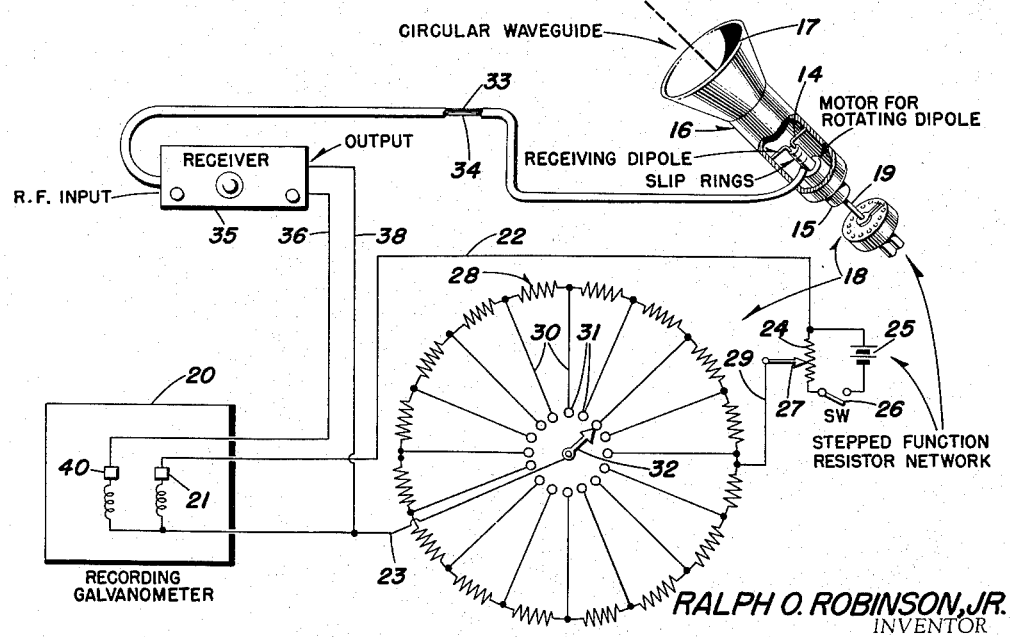
RALPH O. ROBINSON, JR.
INVENTOR
BY
ATTORNEY

RALPH O. ROBINSON, JR.
INVENTOR

2,995,749
ROLL INDICATION SYSTEM

Ralph O. Robinson, Jr., Silver Spring, Md., assignor to the United States of America as represented by the Secretary of the Navy
Filed May 21, 1952, Ser. No. 289,139
4 Claims. (Cl. 343—100)

This invention relates in general to a system for determining the roll attitude, roll rate, and/or roll direction of an aerial missile or aircraft, and more particularly to a system and method for determining these situations by means of radio wave polarization.

It is one of the objects of this invention to provide a system and method for determining the roll attitude, roll rate, and/or roll direction of an aerial missile or aircraft which is independent of gyroscopes and like devices, and of indicating this information either to a ground based receiving station or to the internal control mechanism within the aerial missile or aircraft.

Another object of this invention is to provide a system and method for determining the roll attitude, roll rate, and/or roll direction of an aerial missile or aircraft in which there are no precessional movements as normally obtained with gyroscopes.

Still another object of the invention is to provide a system and method in which roll measurements, such as roll attitude, roll rate, and/or roll direction, of an aerial missile can be interpreted and retransmitted to the missile in the form of a signal from a mechanism which would be too complex or too sensitive to incorporate in the missile, particularly small aerial missiles which are unable to carry large explosive charges.

Other objects and many of the attendant advantages of this invention will be readily appreciated as the same becomes better understood by reference to the following detailed description when considered in connection with the accompanying drawings wherein:

FIG. 1 illustrates a schematic of a roll attitude indicating system, embodying the features of the invention; and FIG. 2 illustrates a sample record of roll measurements of an aerial missile obtained by the roll attitude indicating device and recorded from a ground receiving antenna.

The system and method for determining roll characteristics of an aerial missile or aircraft are based upon the principle that the current which flows in an infinitesimal dipole as a result of a plane electromagnetic wave will vary as the cosine of the angle between the longitudinal axis of the dipole and the electric vector of the field.

In utilizing this principle, there is installed in an aerial missile an antenna capable of radiating a radio wave of "pure" polarization, that is, one consisting of a single plane polarized wave whose wave front contains an electric fiield, the intensity of which varies as the cosine of the angle between its maximum value and zero when measured in a plane perpendicular to the direction of propagation of the wave. At a suitable location, either on the ground or in the missile or aircraft, there is installed a "suitably designed" receiving antenna, that is, one in which the intensity of the signal received will vary as the cosine of the angle of its maximum sensitivity and its null position as the plane of polarization of the received wave is rotated.

As either the transmitting antenna or the receiving antenna is orientated one perpendicular to the other, the signal introduced in the receiving antenna will approach zero. If no wave other than the direct wave from the transmitting antenna reaches the receiving antenna, the signal received will be zero when the two antennas are perpendicular. During a single revolution of either antenna, the exact relative positions of the antenna will be precisely indicated when the projection of one antenna is perpendicular to the other. Thus, two signal minimas will occur for each revolution of an antenna.

Referring now to FIG. 1 of the drawings for a more detailed understanding of the invention, missile 10 is rolling about its longitudinal axis at a relatively slow rate of roll, say one revolution per second. Upon this missile 10 there is mounted an antenna 12, for example, a notch excited fin antenna, which is perpendicular to the longitudinal axis of the missile. On the ground in back of the missile launcher (not shown), there is located a short receiving dipole antenna 14 rotating about its center by a motor 15 at a speed of 10 r.p.s. This antenna 14 is located within a cylindrical horn 16 which will give directional properties to the dipole antenna 14 so as to discriminate against reflected waves. A circular waveguide 17 is located adjacent to horn 16. It is so arranged as to "see" only the direct wave from the missile 10. If properly designed, such a system will indicate the position of the missile 10 relative to the receiving antenna 14 at the approximate rate of 20 times per second (faster if the missile 10 were rolling in the direction opposite to the rotation of the receiving antenna 14 and slower if in the same direction). In order to ascertain the position of the missile 10, it would only be necessary to refer to the nulls produced when the two antennas 12 and 14 are perpendicular to determine the angular position of the receiving antenna 14 when these nulls occurred, at which time the missile antenna 12 will be perpendicular to the receiving antenna 14.

This position of the dipole antenna 14 at any instant will be determined by either a continuously variable resistance or by a stepped function resistance device, such as 18, attached to the same shaft 19 from motor 15 that drives the rotating dipole antenna 14. This device 18 is electrically connected to a recording galvanometer 20 by means of leads 22 and 23 for recording on a paper trace 21 the obtained signal. In lead 22, there is located, in parallel, a resistance or potentiometer member 24 and a battery or power source 25. A switch 26 is also provided between the power source 25 and the potentiometer member 24. A pick-off element 27, for potentiometer 24, is connected to the resistance elements 28 of device 18 by means of lead 29. Each resistance element 28 is connected by leads 30 to tap elements 31 at the center of device 18. A contact arm 32 is provided in lead 23 on the device 18 for making contact with the resistance elements 28.

The radio frequency signal from dipole antenna 14 is fed by leads 33 and 34 to receiver 35, and the output signal therefrom is fed by leads 36 and 38 to the recording galvanometer 20, and is recorded on paper trace 40.

A reasonable number of resistance steps 28, say 36, would result in one step per 10 degrees of rotation. This could be indicated on the recording galvanometer 20 which is capable of responding to approximately 1000 to 2000 c.p.s. If the sensitivity of the galvanometer 20 is adjusted to give four (4) inches deflection for the first 18 increments, each increment represents a step function of .22 inch. The second 18 increments will then cause a trace 21 in galvanometer 20 to return in the same manner to its steady state position.

Since the dipole 14 will rotate at a uniform rate 36 steps might not necessarily assure optimum resolution but in the final analysis more or less steps might be taken pererevolution to assure maximum resolution. In this case each increment could be made to represent a greater or less angular displacement with a corresponding increase or decrease in the size of each increment.

With an assumed "reading accuracy" of .01 inch, a paper speed of 3 feet per second each degree of revolution can be read as long as the speed of the dipole 14 is kept below 10 r.p.s. (twenty measurements per seconds). With a paper capacity of 200 feet, this represents a recording capacity of about 60 seconds flight time.

The measurement of the position of missile 10 can be made at each minimum of signal strength. However, sufficient sensitivity must be provided to assure an accurate determination of signal strength minima. A sample record of the roll indication device is illustrated in FIG. 2.

Since the rule of the current varying as the cosine of the angle is of a fundamental nature, the realization of the ultimate accuracy in such measurements will depend upon different factors, one of which is the purity of the polarization of the transmitted wave.

Another factor is the accuracy with which the position of the receiving dipole 14 can be determined. This accuracy is closely associated with initial alignment of the ground antenna 14 and with the speed of the recording paper upon which this measurement is transcribed. There appears to be no fundamental reason why better than ±1° accuracy of receiving antenna position cannot be realized.

Other factors in the ultimate accuracy of roll measurements are the ability of the receiving antenna 14 to discriminate against spurious signals in favor of the direct wave from the missile 10, the sensitivity of the receiver 35 and the power out-put of the transmitter and their separation, and the trajectory of the missile 10. The accuracy will be greatest when the missile 10 is flying on a straight line away from the launcher position. The system will tolerate, with no appreciable loss of accuracy, a ±15 degree deviation from that trajectory providing the angle of a track is not over 10°.

Another factor to be considered is diffraction due to hot gases. As long as a relatively low radio frequency such as, for example, 220 mc. is used, no difficulty is anticipated from this effect.

The method and system for determining roll attitude, roll rate, and/or roll postion, has many applications and advantages some of whch are outlined below.

The system and method does not depend upon gyroscopes, and thus offers another method of checking gyroscopes. There are no precessional movements as with gyroscopes, thus yielding roll attitude information having a constant absolute accuracy as a function of time.

Another important feature is that roll information could, if desirable, be measured at some location other than at the missile, such as the site from which the missile is launched. The roll information could be digested by a computer which might be too complex or too sensitive to incorporate in a missile, and retransmitted to the missile in the form of a corrective order to the control mechanism contained within the missile.

The simplicity of the system described above is particularly advantageous for the smaller missiles which are unable to carry large explosive charges.

Obviously many modifications and variations of the present invention are possible in the light of the above teachings. It is therefore to be understood that within the scope of the appended claims the invention may be practiced otherwise than as specifically described.

What is claimed is:

1. In a roll indication system for missiles, an antenna for receiving a wave of plane polarization, means for rotating the antenna in a plane normal to the direction of propagation of said wave, resistance means variable by said antenna rotating means, a recording galvanometer calibrated to record signal amplitude and degrees of rotation, a receiver connected to the antenna and having its output connected to said galvanometer, whereby the galvanometer will be caused to produce a trace indicative of the continuously changing amplitude of the polarized wave as a result of the continuously changing position of said antenna with respect to said wave, a power source, and means connecting the resistance means and power source in an electrical circuit with the galvanometer, said galvanometer and resistance means producing simultaneously with the production of the first-mentioned trace a second trace indicative of the position in degrees of the wave plane with respect to the antenna.

2. The apparatus recited in claim 1, wherein said resistance means consists of a stepped function resistor network.

3. The apparatus recited in claim 1, wherein said antenna rotating means includes a motor having a rotatable shaft, and said resistance means includes a pluraltiy of serially connected resistor elements arranged about said shaft, taps electrically connected to the resistor elements and a contact arm mounted on the shaft and selectively engageable with the taps as said shaft is rotated.

4. In a roll indication system for missiles, a dipole antenna for receiving a wave of plane polarization, means for rotating the antenna in a plane normal to the direction of propagation of said wave, a horn surrounding the antenna for imparting directional characteristics thereto and discriminataing against reflected waves, resistance means variable by said antenna rotating means, a recording galvanometer calibrated to record signal amplitude and degrees of rotation, a receiver connected to the antenna and having its output connected to the galvanometer, said galvanometer producing from the receiver output a trace indicative of the continuously changing amplitude of the polarized wave as a result of the continuously changing position of said antenna with respect to said wave, a power source, and means connecting the resistance means and power source in an electrical circuit with the galvanometer, said galvanometer and resistance means producing simultaneously with the production of the first-mentioned trace a second trace indicative of the position in degrees of the wave plane with respect to the antenna.

References Cited in the file of this patent

UNITED STATES PATENTS

| | | |
|---|---|---|
| 2,362,832 | Land | Nov. 14, 1944 |
| 2,405,597 | Miller | Aug. 13, 1946 |
| 2,483,790 | Stanko | Oct. 4, 1949 |
| 2,502,394 | Smith | Mar. 28, 1950 |